United States Patent
Zuleta et al.

(10) Patent No.: US 7,275,430 B2
(45) Date of Patent: Oct. 2, 2007

(54) METHOD AND APPARATUS FOR DETECTING LIQUID LEVELS IN LIQUID-STORAGE CONTAINERS

(75) Inventors: Marco Zuleta, Miami, FL (US); William W. Li, Miami, FL (US); Elgardo Echevarria, Miami, FL (US); Tan Nguyen, Pembroke Pines, FL (US); Rongchang Xin, Miami, FL (US)

(73) Assignee: Beckman Coulter, Inc., Fullerton, CA (US)

( * ) Notice: Subject to any disclaimer, the term of this patent is extended or adjusted under 35 U.S.C. 154(b) by 0 days.

(21) Appl. No.: 11/246,349

(22) Filed: Oct. 7, 2005

(65) Prior Publication Data

US 2007/0079653 A1    Apr. 12, 2007

(51) Int. Cl.
 *G01F 23/24* (2006.01)
(52) U.S. Cl. .................................. 73/304 R
(58) Field of Classification Search .............. 73/304 R, 73/290 R
 See application file for complete search history.

(56) References Cited

U.S. PATENT DOCUMENTS

| 4,326,851 | A | 4/1982 | Bello et al. |
| 4,736,638 | A | 4/1988 | Okawa et al. |
| 4,846,003 | A | 7/1989 | Marquiss |
| 4,977,786 | A | 12/1990 | Davis |
| 5,562,003 | A | 10/1996 | Lefebvre |
| 5,627,522 | A | 5/1997 | Walker et al. |
| 6,253,611 | B1 | 7/2001 | Varga et al. |
| 6,513,378 | B1 | 2/2003 | Love, Jr. |
| 6,962,079 | B2 * | 11/2005 | Eguchi et al. ............ 73/304 R |
| 2005/0013744 | A1 | 1/2005 | Nagai et al. |
| 2006/0021432 | A1 * | 2/2006 | Salzmann et al. ........ 73/304 R |

* cited by examiner

*Primary Examiner*—Hezron Williams
*Assistant Examiner*—John Fitzgerald
(74) *Attorney, Agent, or Firm*—Warren W. Kurz; Mitchell E. Alter

(57) ABSTRACT

A method and apparatus for sensing different levels of liquids in their respective containers in a liquid-consuming and/or producing instrument system. According to a preferred embodiment, an elongated liquid-sensing probe having axially spaced electrodes adapted to sense liquid at multiple levels is arranged in each container of liquid. A controller, e.g. a suitably programmed microprocessor, operates to selectively poll different pairs of electrodes carried by the probe to determine whether or not the polled electrode pairs are immersed in the contained liquid. Preferably, the polling circuit comprises an electronically-controlled resistor that serves to normalize the level-sensing output signal for liquids of different bulk resistivity.

4 Claims, 5 Drawing Sheets

METHOD AND APPARATUS FOR DETECTING LIQUID LEVELS IN LIQUID-STORAGE CONTAINERS

BACKGROUND OF THE INVENTION

1. Field of the Invention

The present invention relates to improvements in methods and apparatus for detecting the liquid level in one or more liquid-storage containers. The apparatus of the invention is particularly useful in automated laboratory instruments, e.g., hematology and other flow-cytometric instruments, that gradually consume liquids of different types and require that the respective levels of such liquids be maintained above a certain level in their storage containers for effective operation of the instrument.

2. The Prior Art

Many automated laboratory instruments that operate to analyze the content of test samples presented to them for analysis consume a variety of liquids in performing their analytical tasks. For example, in analyzing a multitude of different blood samples, hematology and other flow-cytometric instruments will gradually consume a host of different liquid reagents, e.g., lyse, lyse-stabilizer, stains, antibodies, etc., which are selectively mixed with small portions of each sample to condition such portions for subsequent analysis or testing. Such instruments also consume relatively large amounts of non-reactive liquids, such as diluents, that serve not only to reduce the concentration of the blood sample and/or reagents prior to analysis or mixing, but also to cleanse different blood-contacting components of the instrument system (e.g., aspiration and dispensing probes, mixing chambers, blood-sampling valves, etc.) after each sample analysis in order to prevent sample carry-over from one analysis to another. In addition to consuming various liquids, these instruments produce liquid waste products in the form of non-used portions of the reactive and non-reactive liquids, and blood-containing mixtures that have been used for analysis. As produced, these liquid waste products are commonly directed to one or more waste containers that must be emptied or replaced after the waste liquid reaches a certain fill level. As the reactive and non-reactive liquids are consumed, and as the liquid waste products are accumulated, it is necessary to frequently detect the level of each liquid in its storage container. Should any one of the liquids used for an analysis be allowed to "run dry" in the middle of a test, inaccurate results will be reported. Similarly, should a container of waste liquid overflow its storage container, a biologically hazardous clean-up process is necessitated. Thus, before each analysis is initiated, it is common in such instruments to check all of the liquid levels to assure that there is an ample supply of liquids needed for a particular test, and to assure that there is ample volume in the waste storage container(s) to accept all liquid waste products resulting from such test.

Reagents and diluents of the type noted above are commonly supplied by their respective manufacturers in relatively large containers of different sizes and shapes. Rather than providing a liquid-level-detector that is custom designed for each of the different supply containers, it is common to selectively pump or otherwise transfer a portion of the liquids from their respective supply containers (as provided by the manufacturer) to a relatively small "buffer" container located aboard the instrument. These buffer containers are usually of a standard size, e.g., 5 to 100 milliliters in volume, and are preferably shaped so that the same type of liquid level sensor can be used in each container to detect the liquid level therein. Ideally, the liquid-level-sensor should be capable of detecting the level of liquid within the buffer containers at different levels, e.g., at a "FULL" level, indicating that there is ample liquid to perform any sample analysis required of a given container, and at an "ALMOST EMPTY" level, indicating that the liquid level is dangerously close to a level below which air may enter the reagent-dispensing lines, thereby compromising the results of the analysis and/or requiring a time-consuming re-priming operation to restore the operation of the instrument. In response to a signal indicating an "ALMOST EMPTY" level has been reached, a pump or the like is usually activated to restore the liquid-level in the buffer container to the "FULL" level. In some cases, the liquid-level-sensor should also be adapted to sense an "EMPTY" level to advise the user that the level of liquid has dropped to a level at which start-up and priming procedures are required, and/or that the container is substantially void of liquid.

To detect multiple liquid-levels in buffer containers of the type noted above, it is common to use float-triggered liquid-level sensors located within the buffer container or directly within the much larger reagent supply container. Such float sensors typically comprise an elongated stem member that is vertically supported within the container, and a float member that is slidably-mounted on the stem. In use, the float rests atop the liquid in the container and, as the liquid level within the container rises and falls, the buoyant force of the liquid causes the float to slide vertically along the stem. Often, the float has an embedded magnetically-actuated electrical switch that is actuated by a plurality of axially-spaced magnetic members that are embedded within the stem. Thus, as the float moves up and down the stem in response to a change in liquid level, its embedded electrical switch will open or close as it passes each of the embedded magnetic members in the stem. Different liquid levels within the container can be detected by appropriately positioning the magnetic members in the stem at strategic locations. Typical float sensors of the type described are disclosed, for example, in U.S. Pat. No. 6,513,378 to Love, and U.S. Pat. No. 6,253,611 to Varga et al. A variation of this type of sensor is disclosed in U.S. Pat. No. 5,562,003 to Lefebvre wherein multiple magnetic switches are embedded in the float-guiding member and the float member carries a magnetic member that activates the switches as it floats in close proximity. While the float sensors of the prior art are readily capable of sensing multiple liquid levels in a container, they may be considered disadvantageous from the standpoints that (1) the float member must be relatively large in size in order to be buoyant, thus requiring the buffer containers to be correspondingly large in size to accommodate the float, (2) the container opening must be sufficiently large to enable installation of the float within the container, and (3) the float must be made of a material that does not chemically react with the different reagents and other liquids.

It is known in the art to sense the liquid level in a container by disposing the container on an electrically-conductive plate and lowering an electrically-grounded electrode, e.g., comprising a liquid-aspiration probe, into the container until it contacts the liquid therein. By biasing the plate with an alternating current, a change in capacitance between the electrode and plate is detected as the electrode tip moves from one dielectric medium to another, e.g., from air to liquid. While such a scheme is useful for detecting a single level of liquid, it is not useful for detecting multiple fixed levels of liquid in a container. Such a liquid level-sensing apparatus is described in the commonly assigned U.S. Pat. No. 4,326,851 to Bello et al.

SUMMARY OF THE INVENTION

In view of the foregoing, an object of this invention is to provide a new and improved method and apparatus for sensing multiple levels of liquid in a container.

Another object of the invention is to provide a simple, yet highly reliable, method and apparatus that is universally applicable for monitoring the level of different types of liquids in a plurality of containers of the types commonly used in sophisticated instruments used to analyze biological and chemical samples.

According to a first aspect of the invention, a method for detecting the liquid level in a container of liquid comprises the steps of (a) positioning a linear array of spaced electrodes within the container; (b) selectively applying a pulsed electrical voltage between selected electrode pairs in the linear array; (c) monitoring the voltage across each of the selected electrode pairs; and (d) determining the liquid-level in the container on the basis of a predetermined change in voltage across such selected electrode pairs, as caused by a liquid within the container physically bridging, or non-bridging, such electrode pairs as the liquid level changes within the container. Preferably, the electrodes of the linear array are supported by an elongated probe that can be supported within the container through a hole in the container top or lid.

According to another aspect of the invention, improved apparatus is provided for selectively monitoring the respective levels of different liquids consumed and/or produced by a hematology instrument or other similar bio-chemical analyzers. Such apparatus comprises a plurality of liquid-level-sensing probes, each being disposed within a different container for such liquids, and each comprising an elongated member that supports a plurality of spaced electrodes, each electrode becoming immersed in the contained liquid as the liquid level rises within the container, or becoming exposed to air as the liquid level drops. A controller operates to poll selected electrode pairs within the containers to determine the impedance between such electrode pairs and, hence, the level of liquid in each container. Preferably, the controller comprises a programmable impedance by which impedance changes between polled electrodes disposed in different types of liquids are substantially normalized.

The invention and its advantages will be better appreciated from the ensuing detailed description of preferred embodiments, reference being made to the accompanying drawings wherein like reference characters denote like parts.

DETAILED DESCRIPTION OF PREFERRED EMBODIMENTS

In the ensuing detailed description, a preferred embodiment of the invention is disclosed as being embodied in a hematology instrument. It will be appreciated, however, that the invention will find utility in many other types of analytical and manufacturing instruments that gradually consume liquids of different types in carrying out the processes for which they are designed, and in which it is particularly important to continuously monitor the level of liquids in different containers to assure that the liquid supplies never "run dry" or overflow their containers. As will become apparent, the invention is particularly useful as the liquid containers of such instruments increase in number and shrink in size to meet strict space requirements on the instrument platform.

Figure 1:
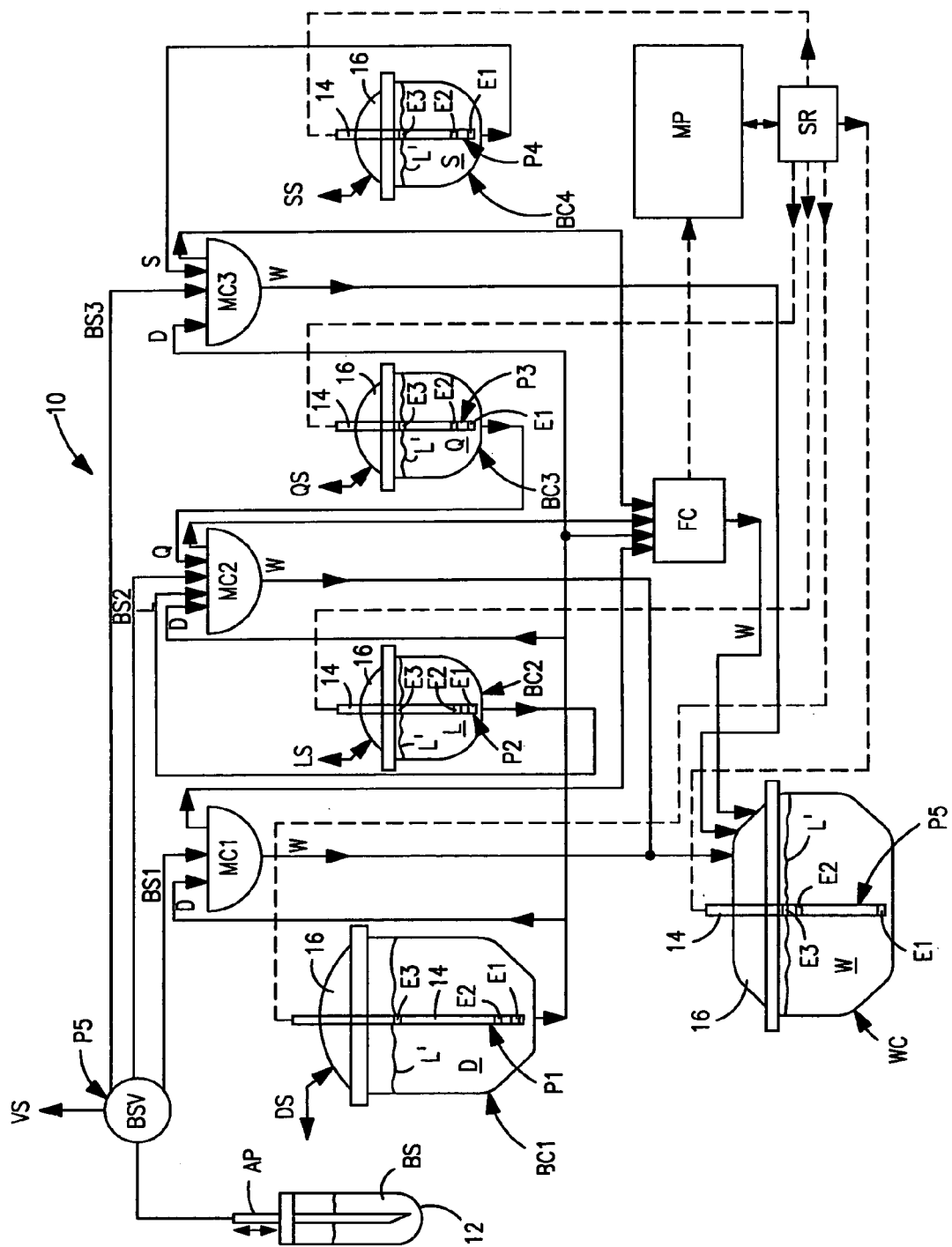
FIG. 1 is a schematic illustration of a hematology instrument embodying the present invention.

Referring now to the drawings, FIG. 1 is a schematic illustration of a conventional hematology instrument 10 embodying the present invention. Briefly, a blood sample BS to be analyzed is selectively aspirated from a sample container 12 via an aspiration probe AP. The latter is selectively connected to a vacuum source VS or an aspiration pump through a conventional blood-sampling valve (BSV). In a well-known manner, the BSV serves to isolate a plurality of precise aliquots of the blood sample that has been aspirated into it for subsequent analysis. In response to the application of a positive pressure to the BSV by a positive pressure source PS or by a suitable dispensing pump, the isolated blood samples BS1, BS2 and BS3 within the BSV are respectively dispensed into a plurality of mixing chambers MC1, MC2 and MC3 where the samples are mixed and/or diluted with reagents and/or diluents for subsequent analysis. In the instrument shown, a diluent D is dispensed from a relatively large (e.g., 100 milliliter) buffer container BC1 to each of the mixing chambers. Similarly, a lyse L and lyse-stabilizing or quenching reagent Q are dispensed to mixing chamber MC2 from relatively small (e.g., 4 milliliter) buffer containers BC2 and BC3, respectively, and a stain reagent S is dispensed to mixing chamber MC3 from a buffer container BC3 of similar size. After appropriate mixing, predetermined volumes of the diluted, lysed and/or stained blood samples are transferred from the mixing chambers to a measurement chamber, such as a conventional flow cell FC for analysis. The output of the measurement chamber is processed by a microprocessor MP to count and characterized different blood cells in the samples, and the effluent from the measurement chamber is collected by a relatively large (e.g., several liters) waste container WC. Meanwhile, the mixing chambers are cleansed with additional diluent, and the effluent is directed to the waste chamber WC.

In the hematology instrument described above, it is important to maintain the level of liquid in the buffer containers BC1-BC4 at or above a level at which ample reagent is available for an ensuing analysis of a blood sample. If any buffer container runs dry, thereby allowing air to enter the dispense line, in the midst of providing reagent to the mixing chambers, the test results could be erroneous. Further, it is important to assure at the outset of each analysis that there is ample volume (i.e., air space) in the waste container WC to receive the liquid waste products of the ensuing analysis; otherwise, a major clean-up is likely to be required.

As noted above, it is known in the art to sense different levels of liquid in reagent containers using various types of floatation devices that rest on the surface of the reagent in the container and move vertically as the liquid level changes.

But such devices are problematic, at least for the reasons already noted above. Thus, it is desirable to provide a liquid-level-sensing system that overcomes the drawbacks of such devices.

Now in accordance with a preferred embodiment of the present invention, each of the above-noted buffer containers BC1-BC4, as well as the waste container WC, is provided with a liquid-level-sensing probe, designated as probes P1-P5, respectively, in the FIG. 1 apparatus. When "polled" by the microprocessor MP, as described below, each of the liquid-level-sensing probes is adapted to provide information by which the microprocessor can determine whether the level L' of liquid in the associated container is either at (a) a substantially FULL level, (b) a substantially EMPTY level, or (c) a predetermined intermediate level indicating that the liquid in the container requires attention. In the case of the buffer containers, such intermediate level may be an ALMOST EMPTY level, indicating that reagent replenishment is required; in the case of the waste container, such intermediate level may be an ALMOST FULL level, indicating that the waste container needs emptying or replacement before further analyses can be performed.

In the embodiment shown in FIG. 1, each of the probes P1-P5 is depicted as comprising an elongated member 14 that, in use, is adapted to be vertically supported within its associated container, preferably by the container cover or lid 16. It will be appreciated, however, that the probe need not extend in a vertical direction in order to sense different liquid levels. So long as the angle of inclination is known, the microprocessor can readily compute the liquid level above the bottom of the container from the sine of such angle. Each member 14, in turn, supports at least three spaced electrodes, E1, E2 and E3, each electrode being electrically isolated and axially spaced from the others. The bottom-most electrode E1 is positioned at or near the distal tip of each probe and, in use of the probe, this electrode is preferably positioned in close proximity to the container bottom. The top-most electrode E3 of each probe is located on each probe at a position in which the associated container is considered to be substantially FULL of liquid when the probe is supported for use (as describe). As indicated above, the vertical position of the intermediate electrode E2 will depend on the purpose of the container in which the probe is used.

Figure 2:
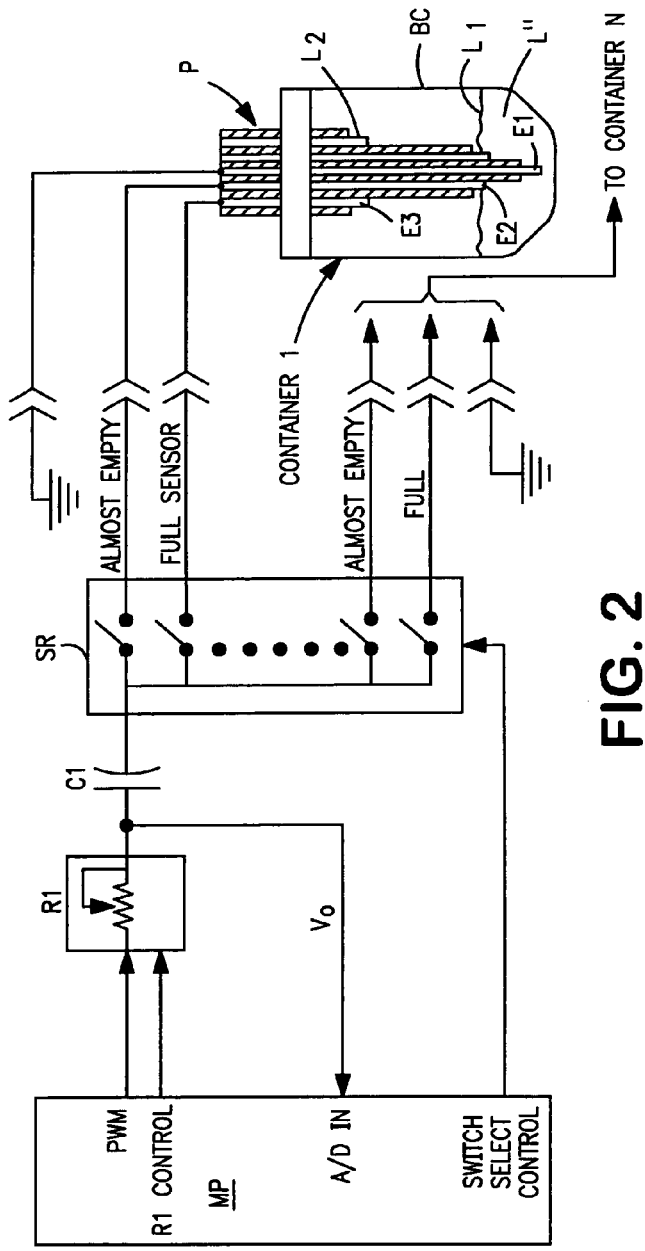
FIG. 2 is a schematic illustration of a preferred embodiment of the liquid level-detecting apparatus of the invention.
Figure 3:
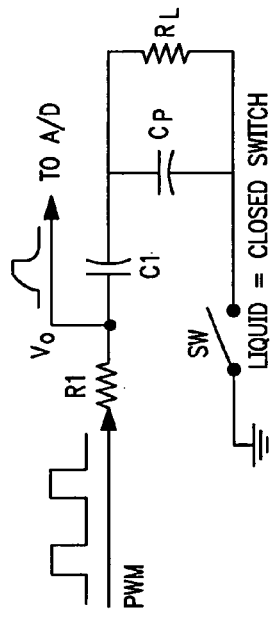
FIG. 3 is an electrical schematic of the equivalent circuit of the FIG. 2 apparatus.

Referring to FIG. 2 wherein a preferred liquid-level-sensing probe P (of the type illustrated in FIG. 6) is shown to be partially immersed in liquid L" contained by a buffer container BC, apparatus is schematically illustrated for periodically "polling" selected pairs of the probe electrodes, i.e., either E1/E2 or E1/E3, and for sensing the resulting voltage across the polled electrode pair to ascertain the level of liquid in the container. As shown, probe P generally comprises an elongated central electrode E1, e.g., a stainless-steel or other electrically-conductive wire, having concentric sleeve electrodes E2 and E3, also made of stainless-steel or other electrically-conductive material, arranged thereabout. As described below, electrodes E2 and E3 are of different length, and electrically-insulating spacers are disposed between adjacent electrodes to provide electrical isolation for each electrode. The distal portion of each electrode is exposed for contact with the liquid in the container. During the above-mentioned polling of electrodes, the central electrode E1 of each probe is connected to a reference potential, preferably ground, and the instrument controller (microprocessor MP) operates to selectively apply a pulse-width modulated (PWM) signal to either of the electrodes E2 and E3. The PWM signal is applied to the electrodes through an RC circuit comprising the series combination of an electronically-controlled resistor R1 (described below), a DC-blocking capacitor C1. An electronically-controlled switching array SR serves to determine which pair of electrodes, E1/E2 or E1/E3, is receiving the PWM signal. The effective circuit of the FIG. 2 apparatus is shown in FIG. 3, wherein $C_P$ is the probe capacitance as measured between the polled electrodes, and $R_L$ is the resistance of the liquid in the container. It will be appreciated that when the liquid level in the container does not shunt electrode pairs E1/E2 or E1/E3, the DC-blocking capacitor C1 is open-circuited because switch SW will be open. As the liquid level rises in container C and switch SW closes as a result of the liquid bridging either electrode pairs E1/E2 or E1/E3, the capacitance between electrode pairs E1/E2 and E1/E3 will change drastically by connecting $C_P$ to the sensing circuit. Because C1 is much larger in value than the probe capacitance $C_P$, the response time of the sensing circuit to the PWM signal is reduced to the point that within the "ON" time of the PWM polling signal, the output signal $V_O$ of the sensing circuit has no time to rise significantly in potential. Notice, this change in response time of the sensing circuit is detected in less than one cycle of the PWM signal (which may be, for example, less than 50 microseconds). This sensing scheme is considerably faster than those prior art schemes that sense changes in the capacitance of the detecting circuit which usually requires several cycles of the applied AC polling signal. At the end of the active portion of the PWM, the microprocessor MP performs an analog-to-digital conversion on the waveform of $V_O$ and determines from the value converted if the liquid was shunting either electrode pair. It will be appreciated that the bulk resistivity of the liquid will determine the extent to which the polling signal (shown as a square wave) will be attenuated when the liquid bridges the polled electrode pairs. Since the resistivity of the various liquids used in a hematology instrument may vary by several orders of magnitude, it is desirable to adjust, prior to each polling process, the value of resistor R1 is electronically-controlled by the microprocessor to account for the resistivity of the contained liquid so that the same polling circuit can be used to detect the level of all liquids regardless of their respective resistances. Thus, the microprocessor is suitably programmed to control the value of R1 for each liquid to normalize the signal change for all liquids.

Figure 4:
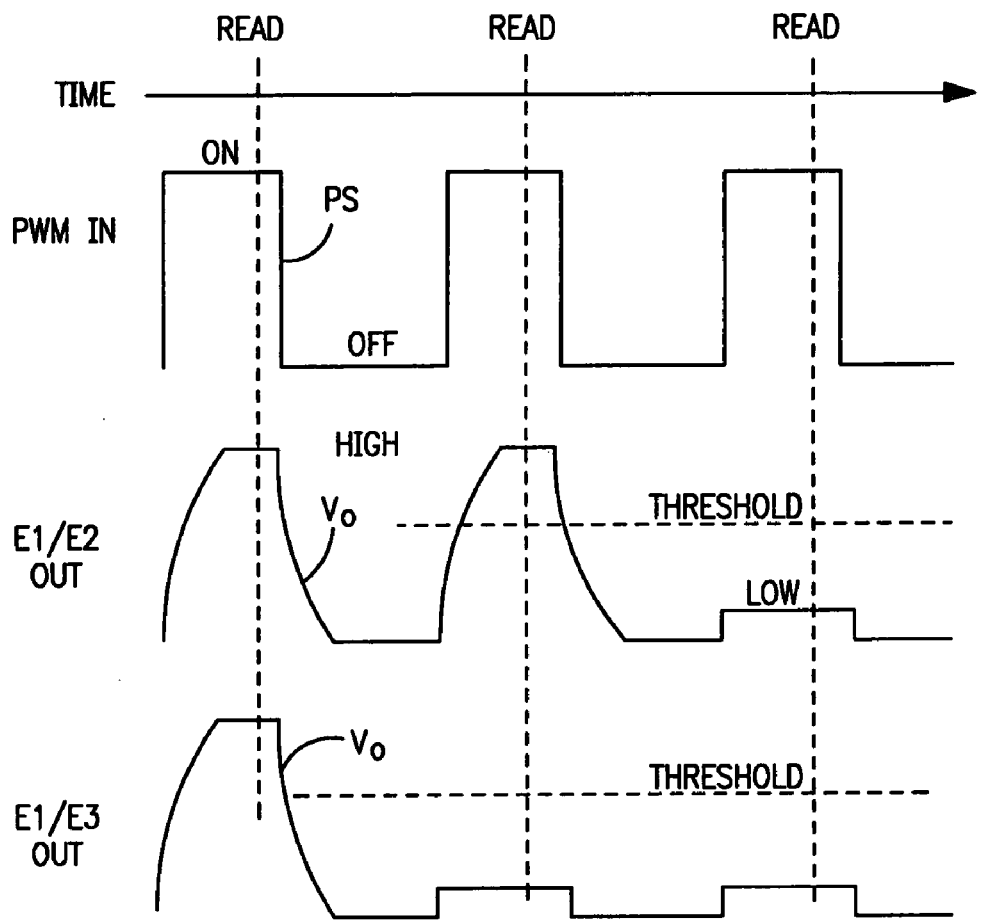
FIG. 4 is a series of waveforms illustrating the method of the invention.
Figure 4:
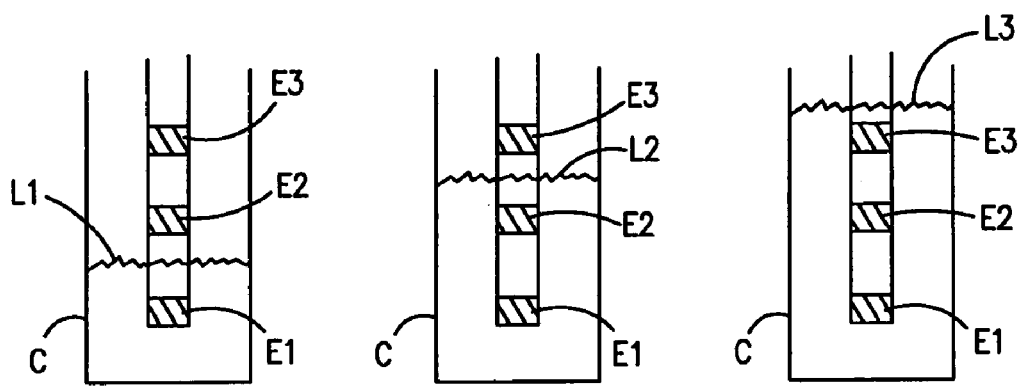

Referring now to FIG. 4, a preferred PWM waveform of the polling signal PS applied to the electrodes E2 and E3 is shown. As noted, electrode E1 is grounded and, thus, the signal applied to electrodes E2 and E3 is effectively applied to each of the electrode pairs E1/E2 and E1/E3. The output $V_O$ of the polling circuit, which is the analog-to-digital input (A/D IN) to the microprocessor, is shown for three different liquid levels, L1, L2 and L3, in the container C. When the level of liquid in the container is at L1, i.e., below both electrodes E2 and E3, there is an open circuit between electrodes E1 and E2, and between electrodes E1 and E3; thus, the output of the sensing circuit will be HIGH (i.e., above a preset threshold value) for both of the polled pairs, E1/E2 and E1/E3, and the microprocessor will determine that the container is substantially empty. When the liquid level is at the intermediate level L2, i.e., between electrodes E2 and E3, both electrodes E1 and E2 are immersed, but electrode E3 remains above the liquid level. Thus, the E1/E2 input to the microprocessor will be LOW (i.e., below the preset threshold value), and the E1/E3 input will remain HIGH, thereby providing an indication that the liquid level is less than FULL, but above the ALMOST EMPTY level. Reagent replenishment is then required. When the liquid level is at level L3, all three electrodes are immersed, and both of the polled electrode pairs E1/E2 and E1/E3 will provide a LOW input to the microprocessor, and the latter will determine that no replenishment of the container is necessary. As indicated above, the value of resistor R1 is selected to normalize the output of the sensing circuit for different liquids, and thereby assuring that the change in the polling circuit output caused by the liquid bridging the polled electrode pair is detectable above and below a predetermined threshold value which defines the HIGH and LOW outputs. In operation, the system controller or microprocessor sequentially polls each pair of electrodes in each container of the instrument to ascertain the liquid level in each container. This process can be effected in less than a second. If liquid replenishment is required, the controller operates to activate a pump to aspirate and dispense the appropriate liquid to the container requiring replenishment. The controller operates to repeatedly poll the probe in the container requiring replenishment until it detects that the FULL level is restored. The controller repeats this process with each container in the instrument.

Figure 5:
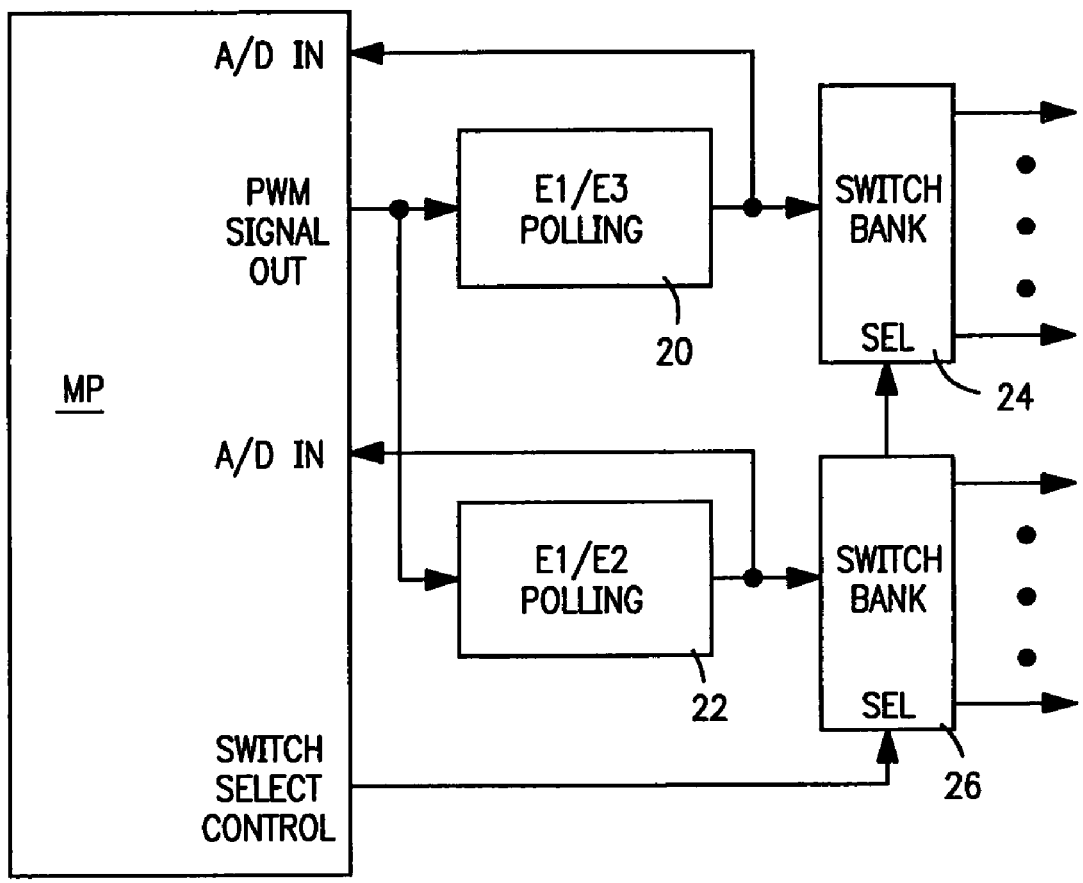
FIG. 5 is a schematic illustration of an alternative embodiment.

In FIG. 5, a variation of the FIG. 4 polling circuit is shown. Here, two separate polling circuits 20, 22 enable simultaneous polling of the electrode pairs, E1/E2 and E1/E3. Thus, this polling scheme increases the rate at which the liquid level can be checked in each container. In this embodiment, two electronically-controlled switch banks 24, 26 selectively apply the PWM polling signal to the electrode pairs, and the polling circuit outputs are simultaneously applied to two inputs of the microprocessor.

Figure 6:
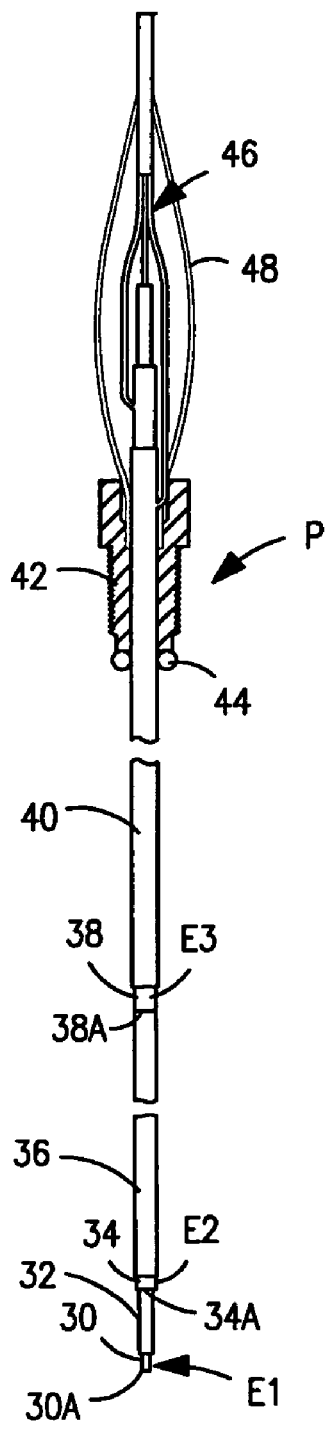
FIG. 6 is an enlarged side view of a preferred liquid-level-sensing probe that is useful in the method and apparatus of the invention.
Figure 7:
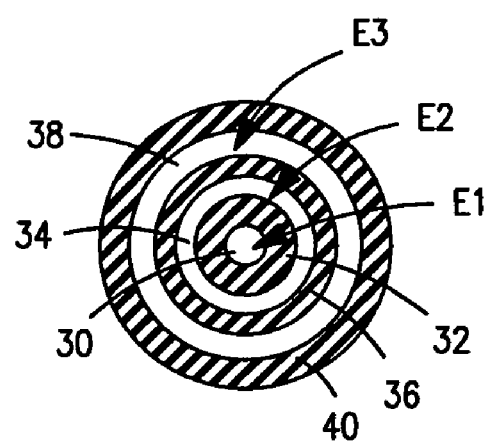
FIG. 7 is a cross-sectional illustration of the FIG. 5 liquid-level-sensing probe.

A preferred liquid-level-sensing probe P is illustrated in FIGS. 6 and 7. As noted above, probe P comprises a central wire or rod 30 made of an electrically conductive material. Except for a short length 30A (e.g. about 1 mm. in length) at its distal end, which serves as electrode E1 in the FIG. 1 apparatus, rod 30 is surrounded by coating 32 of electrically-insulating material. Preferably, the insulating material is inert or non-reactive with the liquid in the containers, and may comprise, for example, any of a variety of polymers or rubber. Concentrically surrounding the electrically-insulating coating 32 is a first electrically-conducting sleeve or cylinder 34 having an insulating coating 36 which surrounds all of cylinder 34 except for a short length 34A (e.g., about 1 mm.) at its distal end. The exposed length of cylinder 34 serves as electrode E2 in the FIG. 1 apparatus. Concentrically surrounding the insulating coating 36 is a second electrically-conducting sleeve or cylinder 38. The latter is provided with an insulating coating 40 that surrounds all but a short length 38A (also about 1 mm. in length) that serves as electrode E3 of the FIG. 1 apparatus. The probe structure is supported for mounting in a container lid or top wall by a threaded bushing 42 having an O-ring seal 44 at one end. Electrical wires 46 are connected to the proximal ends of the conductive elements 30, 34 and 38, and a flexible dielectric shield 48 surrounds and protects the wire connections. It will be appreciated that this type of liquid-level-sensing probe is readily adapted for use in containers of different sizes and shapes, and due to its relatively small size, it is readily adapted for use in small buffer containers of the type mentioned above.

The invention has been described with reference to a preferred embodiment, and it will be appreciated that variations can be made without departing from the spirit of the invention. For example, the number of axially spaced electrodes in the linear array can be easily increased, for example, by increasing the number of concentric sleeves 34, 38 on the probe P, to detect additional levels of liquid in the container. Further, the respective spacings between adjacent electrodes can be varied as is appropriate for the type of liquid in the container. Still further, the bottom electrode in the array, which is preferably grounded, could be an electrically-conductive fixture located on the bottom of each container. Such variations are intended to fall within the scope of the appended claims.

What is claimed is:

1. A method for repeatedly detecting the respective liquid level in each of a plurality of containers containing liquids of different bulk electrical resistivities, said method comprising the steps of:
   (a) positioning a pair of spaced electrodes within each of said containers;
   (b) selectively polling each of said pairs of electrodes by applying a pulsed electrical signal between said selected pairs of electrodes;
   (c) monitoring the voltage between each of said selected electrode pairs while said electrode pairs are polled;
   (d) determining the liquid-level in each of said containers on the basis of a predetermined change in voltage across said selected electrode pairs, as caused by a liquid within the respective containers physically bridging, or non-bridging, said electrode pairs as the liquid level changes within said containers; and
   (e) prior to polling each pair of electrodes in a container, adjusting the amplitude of said pulsed signal in accordance with the bulk electrical resistivity of the liquid within said container, whereby said predetermined change in voltage is normalized for all containers.

2. The method as defined by claim 1 wherein said adjusting step is achieved by using a microprocessor to control the value of an electronically-controlled resistor forming part of an RC circuit through which said poling signal is applied to said selected pairs of electrodes.

3. Apparatus for selectively monitoring the respective levels of liquids disposed within different containers in a hematology instrument or other bio-chemical analyzers, at least some of said containers containing liquids of differing bulk electrical resistivities, said apparatus comprising:
   (a) a plurality of linear arrays of spaced electrodes, each linear array being adapted to be supported within one of said containers, each electrode in an array becoming immersed in the contained liquid as the liquid level rises within the container, or becoming exposed to air as the liquid level drops; and
   (b) a controller for polling selected electrode pairs within selected containers to determine the impedance between such electrode pairs and, hence, the level of liquid in each of said selected containers, said controller comprises a polling circuit for selectively applying a signal pulse between selected electrode pairs in selected linear arrays, and circuitry for monitoring the voltage level across said electrode pairs while said signal pulse is applied; and
   (c) a circuit for normalizing said change in voltage for liquids of differing bulk electrical resistivities.

4. The apparatus as defined by claim 3 wherein said circuit comprises an electronically-controlled resistor forming part of an RC circuit through which said poling signal is applied to said selected pairs of electrodes.

* * * * *